(12) United States Patent
Okiyama

(10) Patent No.: US 11,353,351 B2
(45) Date of Patent: Jun. 7, 2022

(54) METERING DEVICE

(71) Applicant: SODICK CO., LTD., Kanagawa (JP)

(72) Inventor: Takeshi Okiyama, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 177 days.

(21) Appl. No.: 16/853,775

(22) Filed: Apr. 21, 2020

(65) Prior Publication Data

US 2020/0400476 A1    Dec. 24, 2020

(30) Foreign Application Priority Data

Jun. 21, 2019 (JP) ............................. JP2019-115231

(51) Int. Cl.
| | |
|---|---|
| *G01F 11/24* | (2006.01) |
| *A47J 47/01* | (2006.01) |
| *B65D 47/26* | (2006.01) |

(52) U.S. Cl.
CPC ............. *G01F 11/24* (2013.01); *A47J 47/01* (2013.01); *B65D 47/261* (2013.01)

(58) Field of Classification Search
CPC ........ G01F 11/24; A47J 47/01; B65D 47/261; A23L 7/109
See application file for complete search history.

(56) References Cited

U.S. PATENT DOCUMENTS

| | | | | |
|---|---|---|---|---|
| 5,473,825 A | * | 12/1995 | Conselvan | ............... F26B 17/04 34/218 |
| 5,609,093 A | * | 3/1997 | Hohler | .................... A47J 27/18 99/408 |
| 6,045,851 A | * | 4/2000 | Cross | ..................... A23P 30/38 426/451 |
| 2002/0000163 A1 | * | 1/2002 | Pegoraro | .................. A23L 5/13 99/331 |
| 2020/0297022 A1 | * | 9/2020 | Koga | ..................... A23L 7/109 |

FOREIGN PATENT DOCUMENTS

| | | |
|---|---|---|
| JP | S5025034 | 8/1975 |
| JP | H01000413 | 1/1989 |
| JP | H01004131 | 1/1989 |
| JP | 3054430 | 12/1998 |
| JP | 2008111817 | 5/2008 |
| JP | 2012050425 | 3/2012 |
| KR | 20050087579 | 8/2005 |
| WO | 2016129296 | 8/2016 |

OTHER PUBLICATIONS

Office Action of Japan Counterpart Application, with English translation thereof, dated Jun. 23, 2020, pp. 1-4.

* cited by examiner

*Primary Examiner* — Jeremy Carroll
(74) *Attorney, Agent, or Firm* — JCIPRNET

(57) ABSTRACT

A metering device includes a storage tank, a funnel, a feeder, at least one measuring container, a first driver, and a second driver. Liquid and string-shaped foods are sent from the storage tank to the funnel by the feeder. The measuring container is provided under the funnel in a measuring position, and volumetrically meters the string-shaped foods sent from the funnel while ejecting the liquid. The first driver moves the funnel or the measuring container to insert the funnel into the measuring container at a time of metering, and moves the funnel or the measuring container to separate the funnel from the measuring container after metering is completed. The second driver moves the measuring container from the measuring position to an ejecting position.

12 Claims, 11 Drawing Sheets

METERING DEVICE

CROSS-REFERENCE TO RELATED APPLICATION

This application claims the priority benefits of Japanese application no. 2019-115231, filed on Jun. 21, 2019. The entirety of the above-mentioned patent application is hereby incorporated by reference herein and made a part of this specification.

BACKGROUND

Technical Field

The disclosure relates to a metering device, and more particularly relates to a volumetric metering device for volumetrically metering string-shaped foods.

Description of Related Art

In a volumetric metering device, objects to be metered are metered by filling the objects into a measuring container of a predetermined volume. Japanese Patent Publication No. S50-025034 has disclosed a method of closing a supply port of the measuring container to cut off the object to be metered after the filling. Japanese Patent Publication No. H01-004131 has disclosed a method of not closing the supply port of the measuring container after the filling.

SUMMARY

Problems to be Solved

If the supply port of the measuring container is closed after the filling, the metering can be performed with relatively high accuracy. However, when the object to be metered is a string-shaped food, the string-shaped food protruding out of the measuring container may be torn off. On the other hand, if the supply port of the measuring container is not closed after the filling, the metering can be performed with relatively little damage to the object to be metered even though the object is a string-shaped food. However, due to the influence of the string-shaped food hanging over the measuring container, the metering accuracy is relatively poor.

In view of such circumstances, the disclosure provides a metering device, which can perform metering while preventing damaging the string-shaped food and preventing the string-shaped food from hanging over the measuring container during volumetric metering of the string-shaped food.

Means for Solving the Problems

A metering device is provided, including: a storage tank storing liquid and string-shaped foods; a funnel; a feeder sending the liquid and the string-shaped foods from the storage tank to the funnel; at least one measuring container provided under the funnel in a measuring position where the string-shaped foods are metered, and volumetrically metering the string-shaped foods sent from the funnel while ejecting the liquid sent from the funnel; a first driver moving the funnel or the at least one measuring container to an inserted position where the funnel is inserted into the at least one measuring container at a time of metering, and moving the funnel or the at least one measuring container to a non-inserted position where the funnel is separated from the at least one measuring container after metering is completed, in the measuring position; and a second driver moving the at least one measuring container from the measuring position to an ejecting position where the metered string-shaped foods are ejected.

Effects

In the metering device according to the disclosure, the liquid and the string-shaped foods are sent to the funnel while the funnel is inserted into the measuring container. Thus, the measuring container is filled with the string-shaped foods via the funnel. After the metering is completed, the funnel or the measuring container is relatively moved to a non-inserted position where the funnel is separated from the measuring container, so that the liquid and the string-shaped foods in the funnel drop quickly into the measuring container. Thereby, the string-shaped foods are pushed into the measuring container, and the string-shaped food can be prevented from hanging over the measuring container without closing a supply port of the measuring container. In this way, the volume of the string-shaped foods can be accurately metered without damaging the string-shaped food.

DESCRIPTION OF THE EMBODIMENTS

Figure 1:
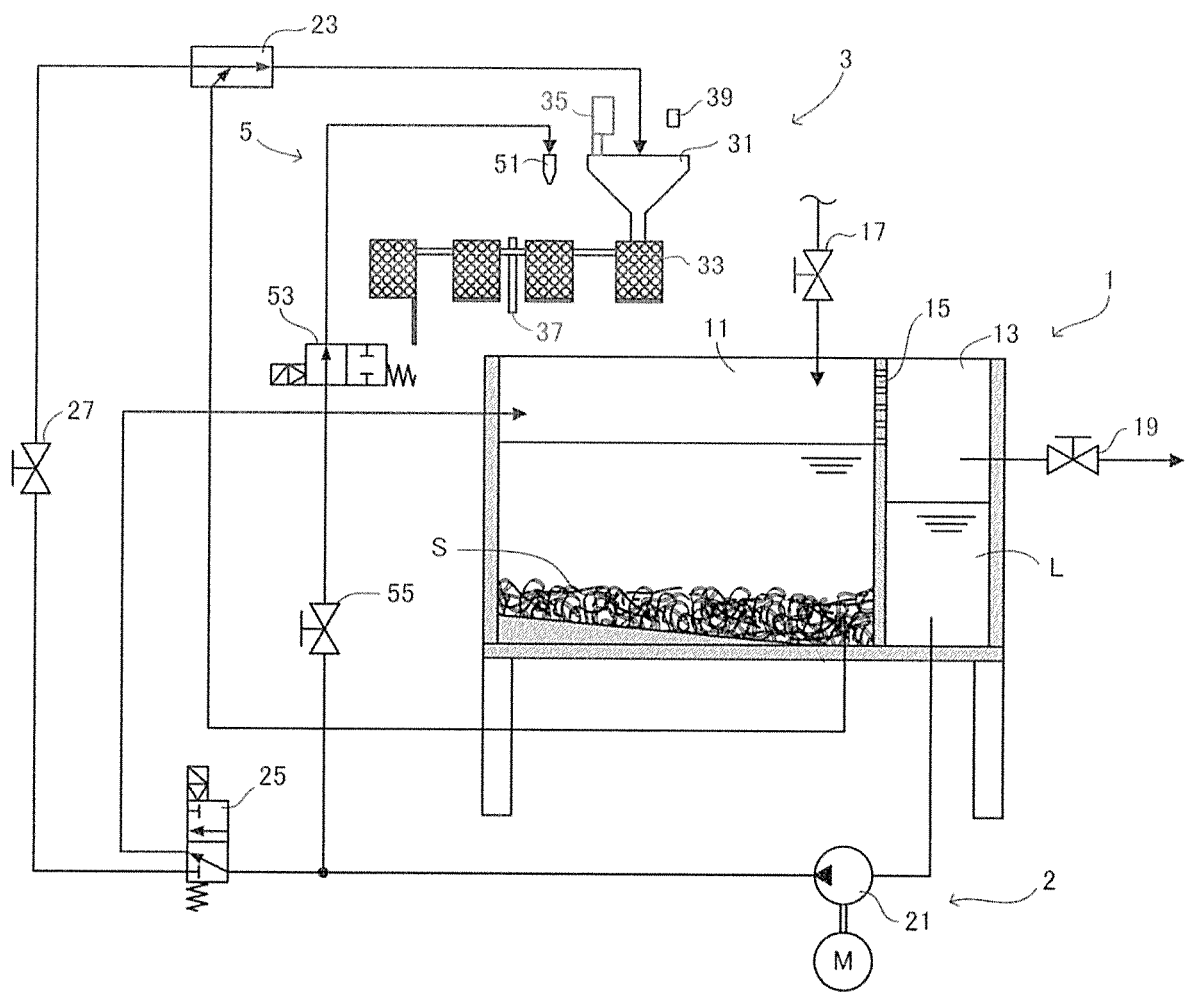
FIG. 1 is a schematic configuration view of a metering device according to an embodiment.

A metering device according to the present embodiment includes a storage tank 1, a feeder 2, a measuring unit 3, a removing device 5, and a controller 6. The metering device transports string-shaped foods S by liquid L and meters a predetermined volume of the string-shaped foods S. The string-shaped food S is, for example, noodles such as udon, buckwheat noodles, Chinese noodles, and long pasta, particularly boiled noodles, but may also be other string-shaped foods. The "noodles" described here broadly refer to a string-shaped food obtained by kneading edible powder and water or the like, and are not limited to those using wheat flour as the raw material. The liquid L is, for example, water. The liquid that has been used in the preprocessing for metering may be used as the liquid L. For example, if the string-shaped food S is boiled noodles, the water that has been used for the boiled noodle processing may be used as the liquid L. The temperature of the liquid L may be adjusted to a suitable temperature according to the state and type of the string-shaped food S. For example, if the string-shaped food S is boiled noodles, the cold water processing for rinsing and cooling the noodles and the metering performed with the metering device may be performed in parallel.

The storage tank 1 stores the liquid L and the string-shaped foods S. As shown in FIG. 1, the storage tank 1 is partitioned into a storage section 11 and an overflow section 13 by a partition plate 15. Through holes are provided in an upper part of the partition plate 15, and the liquid L flows from the storage section 11 to the overflow section 13 through the through holes. The shape of the through hole is not limited as long as the through hole has a size that allows the liquid L to flow through and does not allow the string-shaped food S to pass through. For example, the through holes may be punch holes or meshes. With such a configuration, the liquid L and the string-shaped foods S are stored in the storage section 11, and the liquid L is stored in the overflow section 13. A predetermined amount of the liquid L is supplied to the storage section 11, and the amount of the liquid supplied is adjusted by a liquid supply valve 17. Further, the liquid L that exceeds a predetermined height in the overflow section 13 is ejected out of the device, and the amount of the liquid ejected is adjusted by a liquid ejection valve 19.

The feeder 2 transports the string-shaped foods S to the measuring unit 3 with the liquid L. As shown in FIG. 1, the feeder 2 includes a pump 21, an aspirator 23, a passage switching valve 25, a suction adjustment valve 27, and pipes connecting these units. The pump 21 is connected to the overflow section 13 of the storage tank 1, and pumps the liquid L stored in the overflow section 13 to the aspirator 23. The aspirator 23 has a supply port, a suction port, and an ejection port. The supply port is connected to the pump 21, and the liquid L is sent from the pump 21 to the supply port. The suction port is connected to the storage section 11 of the storage tank 1. Due to the Venturi effect caused by the flow of the liquid L, the string-shaped foods S stored in the storage section 11 are sucked together with the liquid L from the suction port and ejected from the ejection port. The ejection port sends the string-shaped foods S to the measuring unit 3 with the liquid L. The suction adjustment valve 27 is provided between the pump 21 and the supply port of the aspirator 23, and adjusts the amount of the liquid L flowing through to adjust the transport amount of the string-shaped foods S. The pump 21 is, for example, an electric pump.

The passage switching valve 25 is provided between the pump 21 and the aspirator 23, and the pipe branches at the passage switching valve 25. The branched pipe is connected to the storage tank 1. When it is desired to stop the transport of the string-shaped foods S, if the pump 21 is suddenly stopped, the liquid L may flow back into the overflow section 13. The backflow of the liquid L may cause air to flow into the ejection port of the aspirator 23, which may cause the string-shaped food S to flow backward and clog in the pipe connecting the suction port and the storage section 11. By using the passage switching valve 25 to switch the destination of the liquid L pumped by the pump 21 from the aspirator 23 to the storage tank 1, the transport of the string-shaped foods S can be stopped without causing the string-shaped food S to clog in the pipe.

The measuring unit 3 volumetrically meters the string-shaped foods S sent from the feeder 2. As shown in FIG. 1, the measuring unit 3 includes a funnel 31, at least one measuring container 33, and a sensor 39. In the following description, a position where the string-shaped foods S are metered is called a measuring position, a position where the string-shaped food S hanging over the measuring container 33 is removed is called a removing position, and a position where the metered string-shaped foods S are ejected is called an ejecting position. The removing position is provided between the measuring position and the ejecting position. The measuring position and the removing position are preferably provided above the storage section 11 of the storage tank 1 in order to collect the liquid L and the string-shaped food S dropped from the measuring container 33.

The funnel 31 is provided in the measuring position and receives the string-shaped foods S and the liquid L sent from the feeder 2. The funnel 31 is configured to be movable in a vertical direction relative to the measuring container 33 by a first driver 35 in the measuring position. In the present embodiment, the first driver 35 moves the funnel 31 in the vertical direction, but the first driver 35 may move the measuring container 33 in the vertical direction. The first driver 35 positions the funnel 31 in an inserted position where the funnel 31 is inserted into the measuring container 33 at the time of metering, and positions the funnel 31 in a non-inserted position where the funnel 31 is separated from the measuring container 33 at the time of completion of the metering. The first driver 35 is, for example, an electric cylinder or a water pressure cylinder.

The measuring container 33 is provided under the funnel 31 in the measuring position, and has a cylindrical body 41 and a bottom plate 42. The cylindrical body 41 is penetrated vertically, and has through holes on a side surface. The bottom plate 42 closes a lower end of the cylindrical body 41 at least in the measuring position. Preferably, the bottom plate 42 also has through holes. Similar to the through holes of the partition plate 15, the shapes of the through holes of the cylindrical body 41 and the bottom plate 42 are not limited as long as they have a size that allows the liquid L to flow through and does not allow the string-shaped food S to pass through. The string-shaped foods S are sent together with the liquid L from the funnel 31 to the measuring container 33, and the measuring container 33 meters the string-shaped foods S while ejecting the liquid L from the through holes. The measuring container 33 is positioned in the measuring position, the removing position, and the ejecting position by a second driver 37.

A plurality of measuring containers 33 may be provided. By providing the plurality of measuring containers 33, the process in the measuring position, the process in the removing position, and the process in the ejecting position can be performed in parallel so the metering device can be operated more efficiently.

Figure 2:
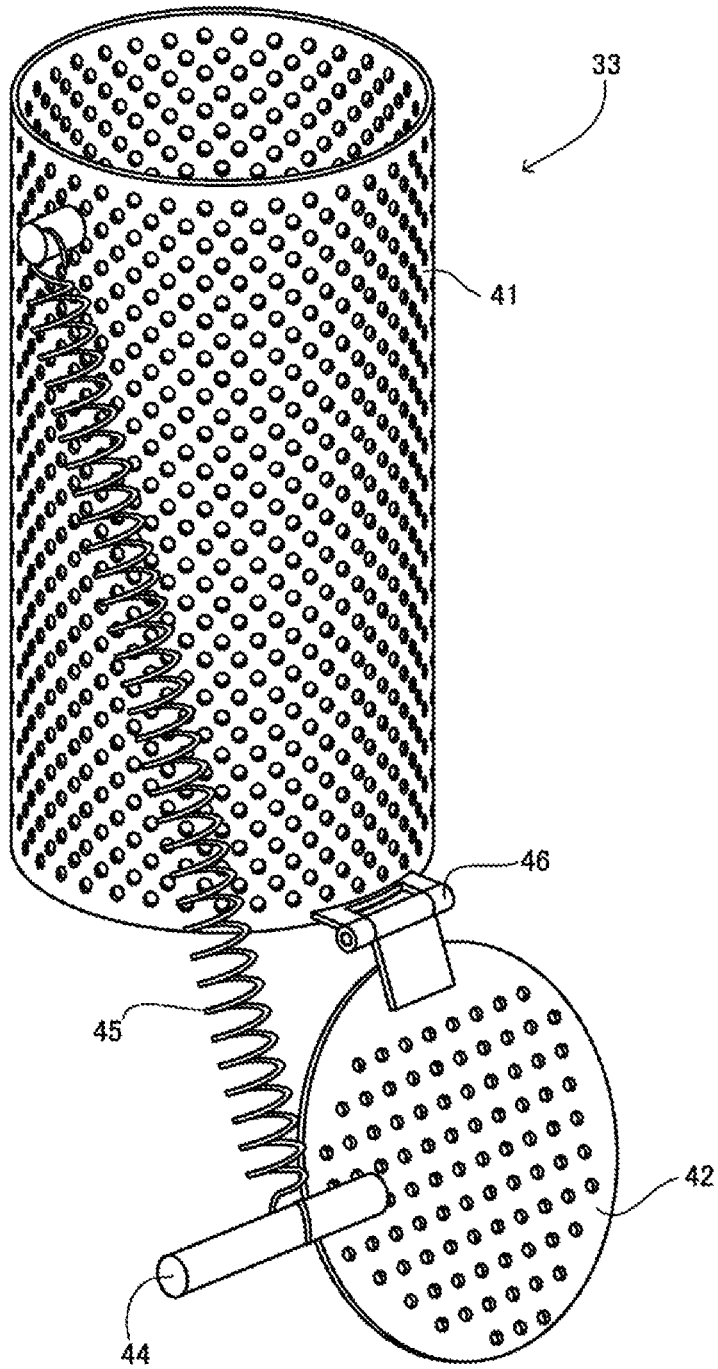
FIG. 2 is an enlarged view showing an example of a measuring container.
Figure 3:
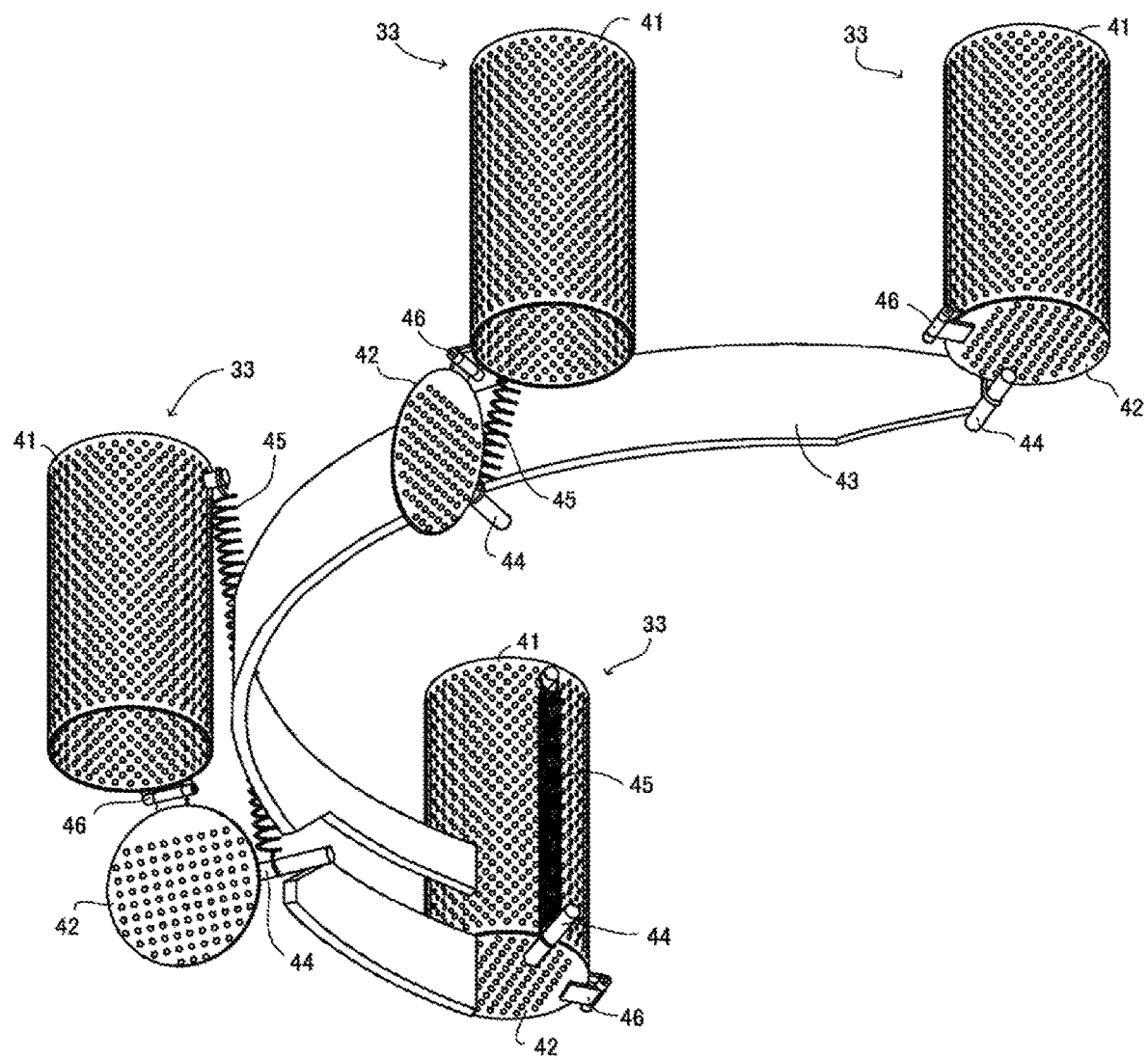
FIG. 3 is an explanatory view showing an opening/closing operation of a bottom plate of the measuring container.

The measuring container 33 may have an optional shape as long as the measuring container 33 is configured to meter and hold the string-shaped foods S in the measuring position, and eject the string-shaped foods S in the ejecting position. For example, as shown in FIG. 2, the bottom plate 42 is configured to be openable and closable. More specifically, the measuring container 33 further has a second engaging portion 44, an elastic member 45, and a hinge 46. The elastic member 45 has one end fixed to the cylindrical body 41 and the other end fixed to the bottom plate 42, more specifically, to the second engaging portion 44 provided on the bottom plate 42, and closes the bottom plate 42 at least when the measuring container 33 moves from the measuring position to the ejecting position. The elastic member 45 is, for example, an extension spring or a rubber. The hinge 46 connects the cylindrical body 41 and the bottom plate 42 to be rotatable. The second engaging portion 44 is provided on the bottom plate 42 and is configured to engage with a first engaging portion 43 provided in the ejecting position. That is, when the second driver 37 moves the measuring container 33 to the ejecting position, as shown in FIG. 3, the first engaging portion 43 and the second engaging portion 44 are engaged to open the bottom plate 42, and the string-shaped foods S are ejected from the lower end of the cylindrical body 41.

Figure 4:
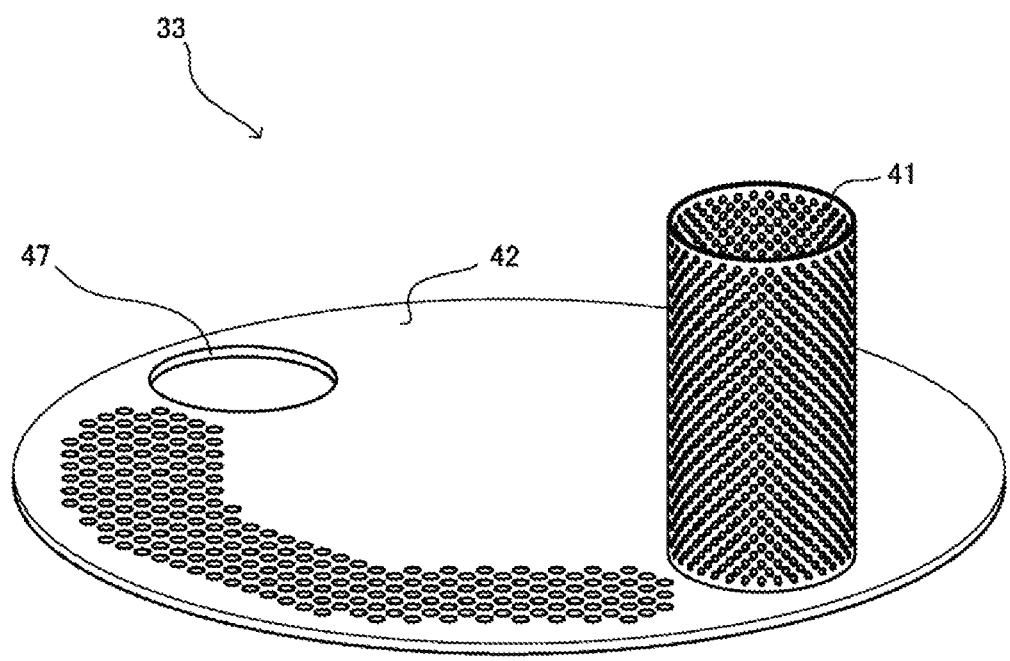
FIG. 4 is an enlarged view showing another example of the measuring container.

As another configuration, as shown in FIG. 4, a relatively large plate as the bottom plate 42 may be provided for closing the lower end of the cylindrical body 41 at least from the measuring position to a position immediately before the ejecting position, and the measuring container 33 may be configured to slide on the bottom plate 42. That is, the measuring container 33 is provided to be in sliding contact with the bottom plate 42. The measuring container 33 is moved by the second driver 37 along an outer periphery of the bottom plate 42 while being in contact with the bottom plate 42. The bottom plate 42 is provided with an ejection port 47 in the ejecting position, and when the measuring container 33 moves to the ejecting position, the string-shaped foods S are ejected through the ejection port 47. Preferably, the through holes of the bottom plate 42 are appropriately arranged from the measuring position to the position immediately before the ejecting position. Although only one measuring container 33 is shown in FIG. 4 for visibility, the plurality of measuring containers 33 may be provided as described above. In that case, the plurality of measuring containers 33 may be arranged on one bottom plate 42.

Two examples of the configuration of the measuring container 33 have been described above. With such a measuring container 33, it is not necessary to provide a separate driver in addition to the second driver 37 when ejecting the string-shaped foods S from the measuring container 33. Therefore, the metering device can be configured more simply. As described above, the measuring container 33 is not limited to the above-described configuration as long as it is configured to be capable of metering and ejecting the string-shaped foods S. For example, the measuring container 33 may be configured by including the cylindrical body 41 and the bottom plate 42 fixed to the cylindrical body 41, and the measuring container 33 may be rotated to eject the string-shaped foods S in the ejecting position.

Figure 5:
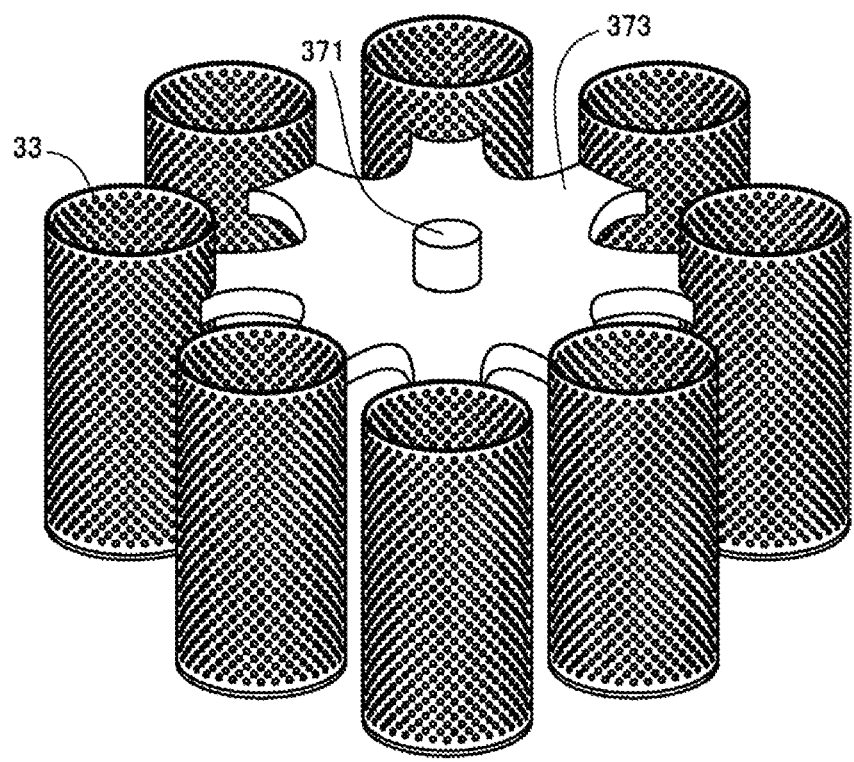
FIG. 5 is an enlarged view of a rotating plate to which a plurality of measuring containers are fixed.

The second driver 37 is an optional device at least capable of moving the measuring container 33 from the measuring position to the ejecting position. As shown in FIG. 5, the second driver 37 has, for example, a shaft 371, a rotating plate 373, and a motor (not shown). The motor is, for example, an electric motor, and rotates the shaft 371. The rotating plate 373 is fixed to the shaft 371 and rotates around the shaft 371. The measuring container 33 is fixed to the rotating plate 373. With such a second driver 37, the measuring container 33 can be pivoted and controlled to be positioned in the measuring position, the removing position, and the ejecting position with a simpler structure.

Nevertheless, the first driver 35 and the second driver 37 are not limited to the configuration specifically described above, and may be any devices as long as they have a power source and a guide moved by the power source. However, the power source of the pump 21, the first driver 35, and the second driver 37 is desirably electric power or water power. As the entire metering device is driven by electric power or water power, the metering device can be easily installed in restaurants and the like.

The sensor 39 is, for example, an optical sensor, and detects that a predetermined amount of string-shaped foods S has been volumetrically metered in the measuring container 33. Specifically, the sensor 39 detects that a part of the string-shaped foods S is present in a predetermined position of the funnel 31. That is, when the sensor 39 detects that a predetermined amount of string-shaped foods S is present in the funnel 31, it is determined that the metering is completed. As described later, in the metering device of the present embodiment, the funnel 31 is pulled out while the measuring container 33 is filled with the string-shaped foods S to some extent, and consequently the liquid L and the string-shaped foods S in the funnel 31 are dropped and the string-shaped foods S are pushed into the measuring container 33. In other words, the liquid L and the predetermined amount of string-shaped foods S need to be present in the funnel 31 when the metering is completed.

The removing device 5 removes the string-shaped food S hanging over the measuring container 33 in the removing position. As shown in FIG. 1, the removing device 5 includes a nozzle 51, a jet on-off valve 53, a jet adjustment valve 55, and pipes connecting these units. The nozzle 51 is provided above the measuring container 33 in the removing position, and ejects the liquid L to the measuring container 33. The nozzle 51 is connected to the pipe between the pump 21 and the supply port of the aspirator 23, preferably the pipe between the pump 21 and the passage switching valve 25, via the jet on-off valve 53 and the jet adjustment valve 55. The jet on-off valve 53 opens/closes the pipe and switches on/off the jet from the nozzle 51. The jet adjustment valve 55 adjusts a flow rate of the liquid L ejected from the nozzle 51. The metering device of the present embodiment is configured so that the string-shaped food S is unlikely to hang over the measuring container 33 during metering, and even if the string-shaped food S hangs over the measuring container 33, the removing device 5 can remove the string-shaped food S hanging over the measuring container 33.

Figure 6:
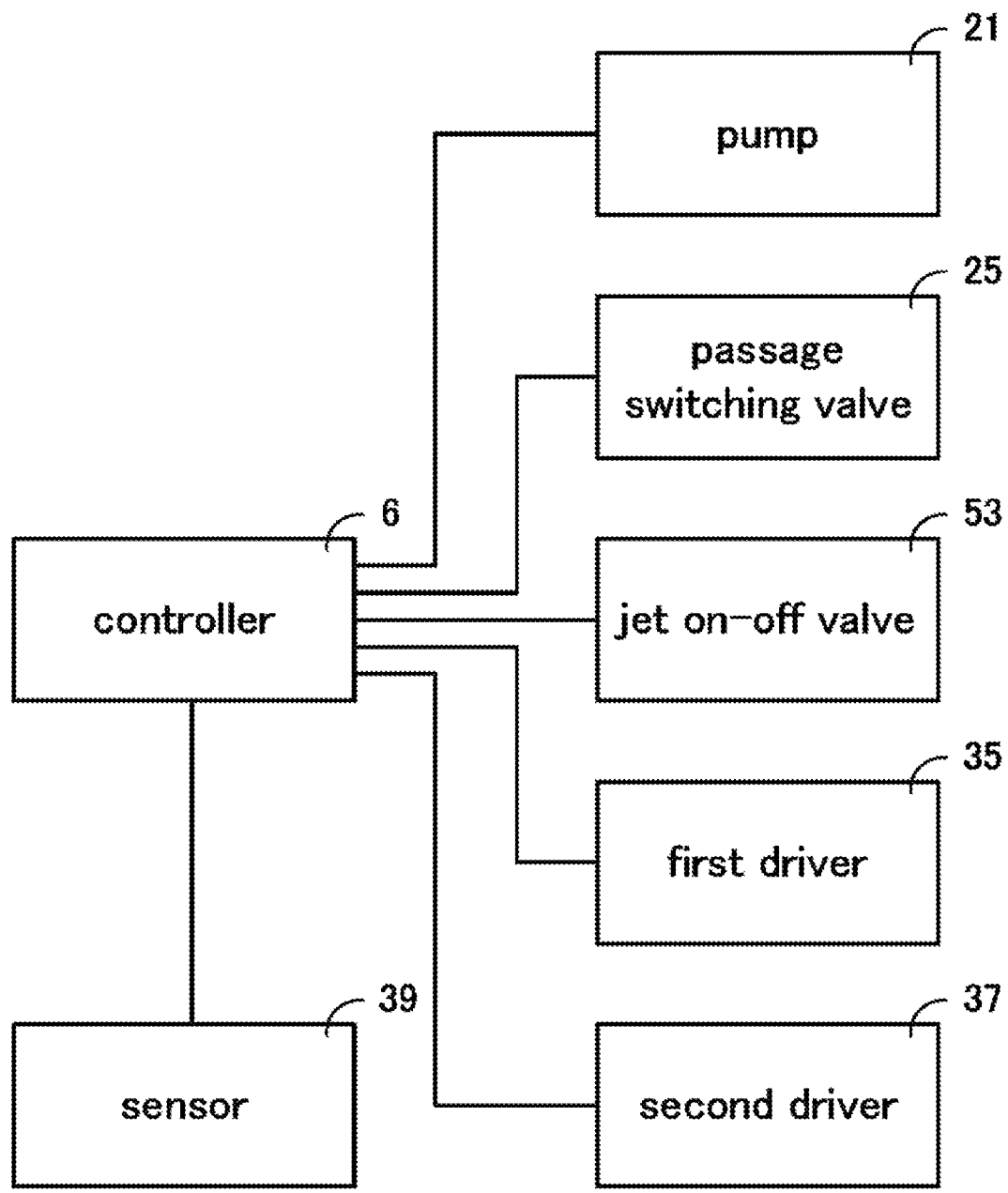
FIG. 6 is a block diagram showing a relationship between a controller and each component.

The controller 6 shown in FIG. 6 controls each unit of the metering device. The controller 6 includes a computation unit and a drive control unit. The computation unit has a processor, a memory, and the like and computes an operation of each unit based on information from the sensor 39. The drive control unit issues an operation command to the pump 21, the passage switching valve 25, the jet on-off valve 53, the first driver 35, and the second driver 37 based on the computation result.

Hereinafter, the operation of the metering device of the present embodiment will be described with reference to FIG. 7 to FIG. 11. In the present embodiment, a measuring process of volumetrically metering the string-shaped foods S, a removing process of removing the string-shaped food S hanging over the measuring container 33, and an ejecting process of ejecting the metered string-shaped foods S are sequentially performed on a predetermined measuring container 33.

First, the string-shaped foods S are supplied to the storage section 11 of the storage tank 1. For example, if the string-shaped foods S are boiled noodles, the string-shaped foods S may be dropped into the storage section 11 together with the liquid L used in the boiled noodle processing or the cold water processing. It is desirable that the storage tank 1 be filled with a predetermined amount of liquid L before the string-shaped foods S are dropped into the storage tank 1.

Figure 7:
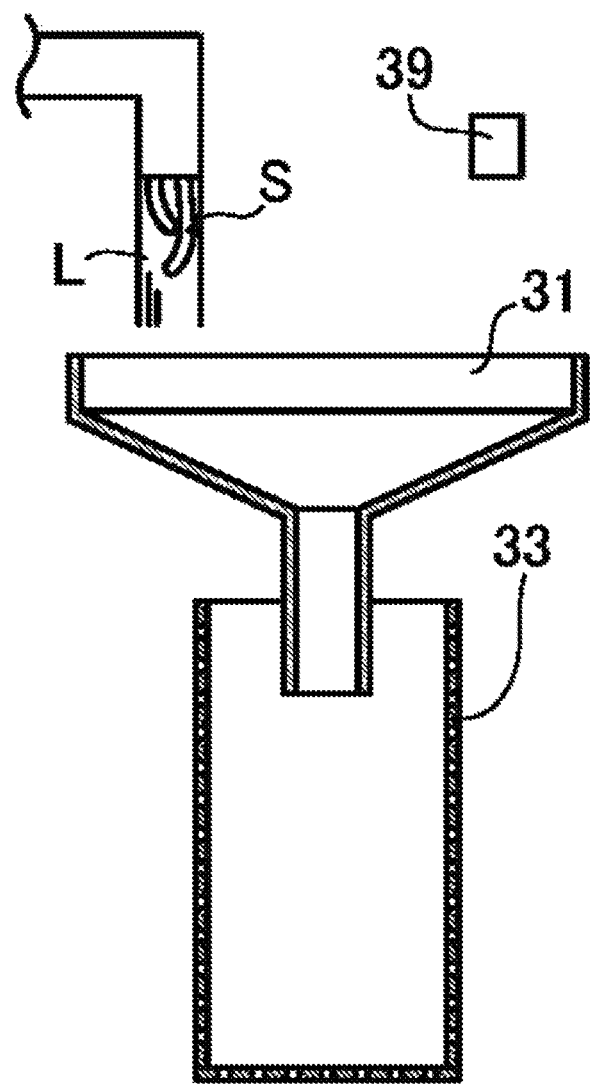
FIG. 7 is an explanatory view showing an operation of the metering device, and shows a state where a funnel is inserted into the measuring container.

Here, the measuring container 33 is positioned in the measuring position by the second driver 37, and the funnel 31 is lowered by the first driver 35 to be inserted into the measuring container 33. In this way, the pump 21 is started while the funnel 31 is inserted into the measuring container 33. Then, the string-shaped foods S in the storage section 11 are sucked by the aspirator 23, and the string-shaped foods S are dropped into the funnel 31, as shown in FIG. 7.

Figure 8:
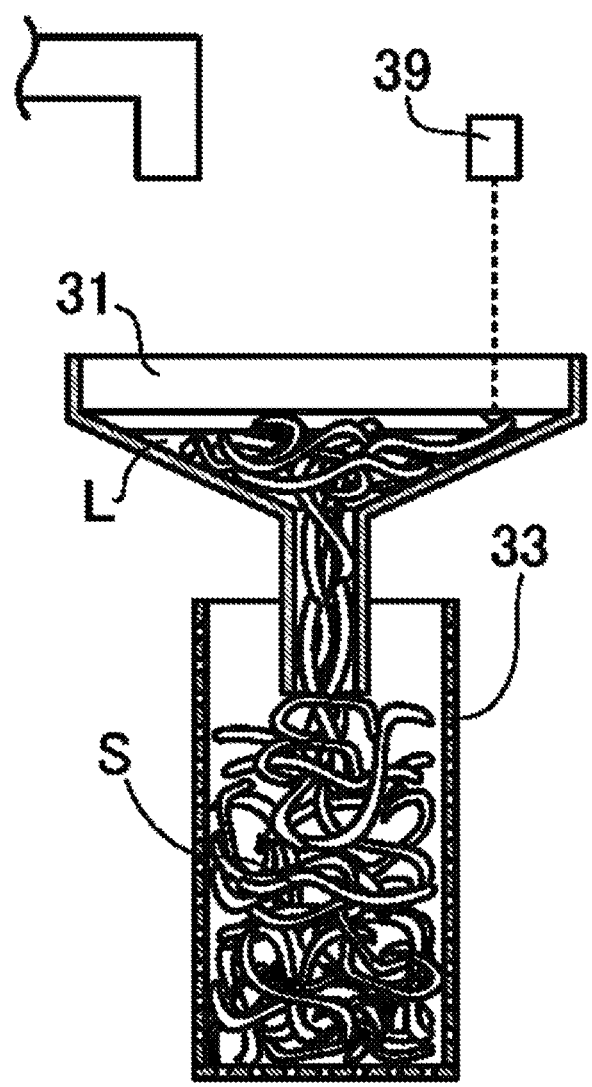
FIG. 8 is an explanatory view showing an operation of the metering device, and shows a state where a predetermined volume of string-shaped foods is metered in the measuring container.

The string-shaped foods S are introduced into the measuring container 33 via the funnel 31 together with the liquid L. The measuring container 33 is filled with the string-shaped foods S while the liquid L is ejected through the through holes provided on the measuring container 33. When the string-shaped foods S accumulating in the measuring container 33 come near the lower end of the funnel 31, the string-shaped foods S also accumulate in the funnel 31 together with the liquid L. For example, the sensor 39 recognizes that the part of the string-shaped foods S is present in a predetermined position in the funnel 31 for a predetermined time, and determines that the metering of a predetermined volume of the string-shaped foods S is completed. When the metering is completed, as shown in FIG. 8, the destination of the liquid L pumped from the pump 21 is switched from the aspirator 23 to the storage tank 1 by switching the passage switching valve 25, and the supply of the string-shaped foods S to the funnel 31 is stopped.

Figure 9:
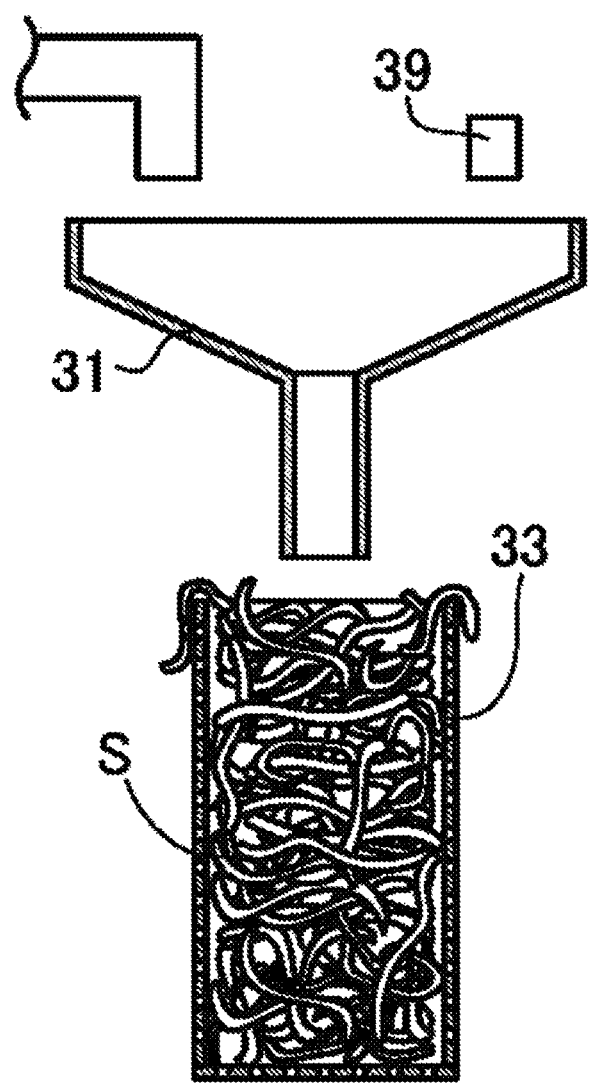
FIG. 9 is an explanatory view showing an operation of the metering device, and shows a state where the funnel and the measuring container are separated from each other.
Figure 10:
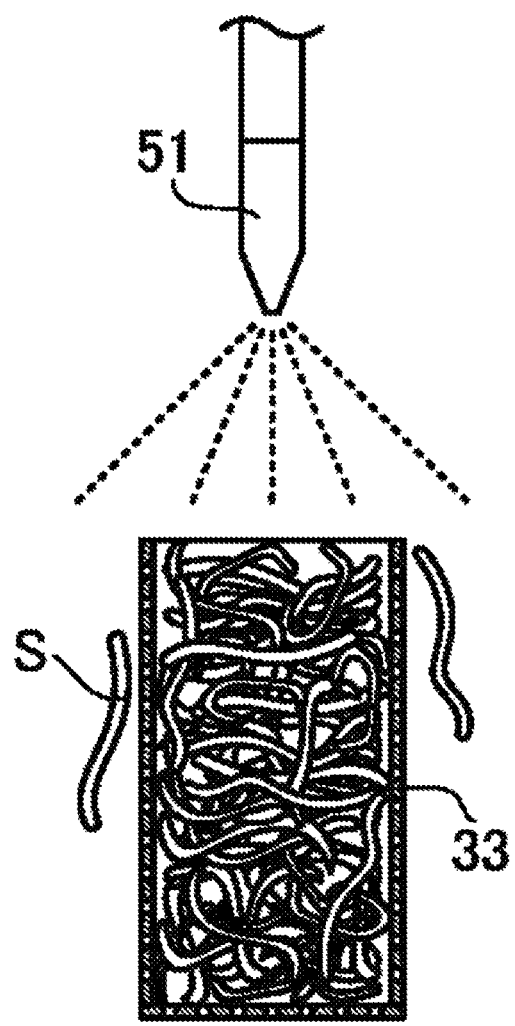
FIG. 10 is an explanatory view showing an operation of the metering device, and shows the measuring container in a removing position.

Then, as shown in FIG. 9, the funnel 31 is raised by the first driver 35, and the funnel 31 is separated from the measuring container 33. As the funnel 31 is pulled out from the measuring container 33, the liquid L and the string-shaped foods S in the funnel 31 quickly drop into the measuring container 33. In this way, while the string-shaped foods S staying in the upper part of the measuring container 33 are pushed into the measuring container 33, the string-shaped foods S in the funnel 31 are supplied into the measuring container 33. Thus, a predetermined volume of the string-shaped foods S is metered, and the string-shaped food S is prevented from hanging over the measuring container 33.

After the measuring process as described above, as shown in FIG. 10, the measuring container 33 is sent to the removing position by the second driver 37. In the removing position, the liquid L is ejected from the nozzle 51 to the measuring container 33. Thus, even if one or a few of the string-shaped foods S hang over the measuring container 33 at the time of metering, the string-shaped food(s) S hanging over the measuring container 33 is removed by the jet from the nozzle 51. The timings for starting and stopping the supply of the jet from the nozzle 51 may be set so that the liquid L is ejected from the nozzle 51 to the measuring container 33 at least in the removing position. For example, the jet on-off valve 53 may be opened to start the supply of the jet from the nozzle 51 immediately before the measuring container 33 is positioned in the removing position, and the jet on-off valve 53 may be closed to stop the supply of the jet from the nozzle 51 after the measuring container 33 passes the removing position. With this configuration, the measuring container 33 moves while being immersed in the jet of the liquid L. Therefore, the string-shaped food S hanging over the measuring container 33 can be more properly eliminated by the force of the jet in the vertical direction and the inertial force in the horizontal direction generated by the movement of the measuring container 33. As described above, by eliminating the string-shaped food S hanging over the measuring container 33, the metering accuracy is relatively improved.

Figure 11:
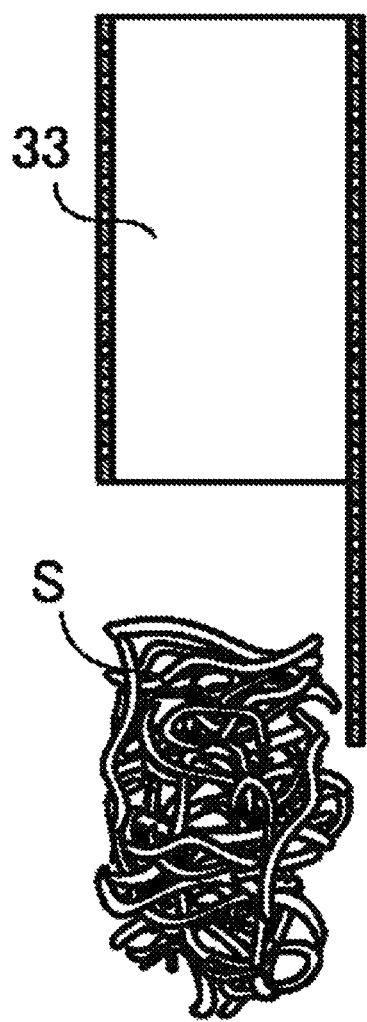
FIG. 11 is an explanatory view showing an operation of the metering device, and shows the measuring container in an ejecting position.

The measuring container 33 that has completed the removing process as described above is sent to the ejecting position by the second driver 37. As shown in FIG. 11, when the measuring container 33 is positioned in the ejecting position, the string-shaped foods S are ejected from the measuring container 33. The ejected string-shaped foods S are ejected through a chute or the like, and is supplied into a container such as a bowl and a tray. The string-shaped foods S may be arranged at predetermined pitches in the container by a conveyor or the like.

The measuring container 33 that has ejected the string-shaped foods S is again positioned in the measuring position by the second driver 37. Then, the measuring process, the removing process, and the ejecting process described above are repeated. If the plurality of measuring containers 33 are provided, the measuring process, the removing process, and the ejecting process may be performed in parallel.

Although the disclosure has been described with reference to the above embodiments, they are not intended to limit the scope of the disclosure. Various omissions, replacements, and changes can be made without departing from the spirit of the disclosure.

What is claimed is:

1. A metering device, comprising:
    a storage tank storing liquid and string-shaped foods;
    a funnel;
    a feeder sending the liquid and the string-shaped foods from the storage tank to the funnel;
    at least one measuring container provided under the funnel in a measuring position where the string-shaped foods are metered, and volumetrically metering the string-shaped foods sent from the funnel while ejecting the liquid sent from the funnel;
    a first driver having a first power source and a first guide moved by the first power source, which are configured to move the funnel or the at least one measuring container in a vertical direction to an inserted position where the funnel is inserted into the at least one measuring container at a time of metering, and move the funnel or the at least one measuring container in the vertical direction to a non-inserted position where the funnel is separated from the at least one measuring container after metering is completed, in the measuring position; and
    a second driver having a second power source and a second guide moved by the second power source, which are configured to move the at least one measuring container from the measuring position to an ejecting position where the metered string-shaped foods are ejected after the funnel or the at least one measuring container is positioned to non-inserted position by the first driver.

2. The metering device according to claim 1, wherein the storage tank comprises:
    a storage section storing the liquid and the string-shaped foods;
    an overflow section storing the liquid sent from the storage section; and
    a partition plate partitioning the storage tank into the storage section and the overflow section, and provided with a through hole at a predetermined height, which allows the liquid to flow through.

3. The metering device according to claim 1, wherein the at least one measuring container comprises a plurality of measuring containers.

4. The metering device according to claim 1, wherein the at least one measuring container comprises:
- a cylindrical body penetrated vertically and provided with a through hole on a side surface, which allows the liquid to flow through; and
- a bottom plate closing a lower end of the cylindrical body at least in the measuring position.

5. The metering device according to claim 4, further comprising a first engaging portion provided in the ejecting position,
wherein the at least one measuring container further comprises:
- an elastic member having one end fixed to the cylindrical body and the other end fixed to the bottom plate;
- a hinge connecting the cylindrical body and the bottom plate; and
- a second engaging portion provided on the bottom plate,
wherein in the ejecting position, the first engaging portion and the second engaging portion are engaged to open the bottom plate.

6. The metering device according to claim 4, wherein the bottom plate is provided with an ejection port ejecting the string-shaped foods in the ejecting position, and
the at least one measuring container slides on the bottom plate in movement from the measuring position to the ejecting position.

7. The metering device according to claim 1, wherein the feeder comprises:
- a pump pumping the liquid; and
- an aspirator having a supply port which is connected to the pump and to which the liquid is sent, a suction port which is connected to the storage tank and to which the string-shaped foods are sent, and an ejection port which ejects the string-shaped foods to the funnel.

8. The metering device according to claim 1, further comprising a sensor detecting that a predetermined amount of the string-shaped foods has been volumetrically metered in the at least one measuring container.

9. The metering device according to claim 8, wherein the sensor detects that a part of the string-shaped foods is present in a predetermined position of the funnel.

10. The metering device according to claim 1, wherein the measuring position is located above the storage tank.

11. The metering device according to claim 1, further comprising a nozzle ejecting the liquid to the at least one measuring container in a removing position located between the measuring position and the ejecting position.

12. The metering device according to claim 11, wherein the removing position is located above the storage tank.

* * * * *